(12) United States Patent
Pounds et al.

(10) Patent No.: US 9,862,504 B1
(45) Date of Patent: Jan. 9, 2018

(54) POSITIONING HOVERING OBJECTS FOR DOCKING

(71) Applicant: Olaeris, Inc, Fort Worth, TX (US)

(72) Inventors: Paul E. I. Pounds, Brisbane (AU); Edward Lindsley, Burleson, TX (US)

(73) Assignee: Olaeris, Inc., Burleson, TX (US)

( * ) Notice: Subject to any disclaimer, the term of this patent is extended or adjusted under 35 U.S.C. 154(b) by 315 days.

(21) Appl. No.: 14/670,913

(22) Filed: Mar. 27, 2015

Related U.S. Application Data

(60) Provisional application No. 61/975,364, filed on Apr. 4, 2014.

(51) Int. Cl.
| | | |
|---|---|---|
| *B64F 1/02* | (2006.01) | |
| *B64F 1/28* | (2006.01) | |
| *B64G 1/64* | (2006.01) | |
| *B64G 4/00* | (2006.01) | |

(52) U.S. Cl.
CPC .............. *B64F 1/02* (2013.01); *B64F 1/28* (2013.01); *B64G 1/646* (2013.01); *B64G 4/00* (2013.01)

(58) Field of Classification Search
CPC .... B64F 1/02; B64F 1/12; B64F 1/125; B64C 2201/182; B64G 1/646; B64G 4/00
See application file for complete search history.

(56) References Cited

U.S. PATENT DOCUMENTS

| | | | | |
|---|---|---|---|---|
| 2,939,657 A | * | 6/1960 | Westcott, Jr. ............. | B64F 1/04 244/115 |
| 4,105,241 A | * | 8/1978 | Mee ........................ | B64G 4/00 294/74 |
| 4,123,020 A | * | 10/1978 | Korsak ................... | B64F 1/125 244/115 |

(Continued)

FOREIGN PATENT DOCUMENTS

| | | | | |
|---|---|---|---|---|
| JP | 2676265 B2 | * | 11/1997 | ............. B64G 1/646 |
| WO | WO 2013055265 A1 | * | 4/2013 | ........... B64C 39/024 |

OTHER PUBLICATIONS

"Non-Final Office Action Issued in U.S. Appl. No. 14/481,428", dated Aug. 16, 2016, 10 Pages.

(Continued)

*Primary Examiner* — Richard R Green
(74) *Attorney, Agent, or Firm* — Michael B. Dodd; Dodd Law Group

(57) ABSTRACT

The present invention extends to methods, systems, devices, apparatus, and computer program products for aligning a target with and/or over and/or into a specific position and orientation. Embodiments include one or more capture components, such as, engagement lines, spars, or struts, that can be actuated together or independently to position a vehicle in a capture area defined by a ring or other geometry. A vehicle can include a sloped surface feature configured to engage with the capture components. When actuated, the capture components draw the sloped surface feature towards (Continued)

and down into the center of the defined capture area. Variations allow a vehicle to be rotated in place, repositioned in place, or clamped securely in place. Positioning and rotation allows alignment with replenishment devices for resupplying and refueling. In this way, a vehicle is relieved from having to have precision terminal guidance for landing and recharging.

14 Claims, 8 Drawing Sheets

(56) References Cited

U.S. PATENT DOCUMENTS

| | | | | |
|---|---|---|---|---|
| 4,236,686 | A * | 12/1980 | Barthelme | B64F 1/00 244/116 |
| 4,523,729 | A * | 6/1985 | Frick | B64F 1/04 244/115 |
| 4,623,183 | A * | 11/1986 | Aomori | B25J 15/103 294/106 |
| 4,750,769 | A * | 6/1988 | Tebb | B64G 4/00 244/172.4 |
| 4,955,654 | A * | 9/1990 | Tsuchihashi | B64G 4/00 244/172.5 |
| 8,172,177 | B2 * | 5/2012 | Lovell | B64C 39/024 244/110 F |
| 8,245,370 | B2 * | 8/2012 | Ritter | B64G 1/646 24/595.1 |
| 8,453,966 | B2 * | 6/2013 | McGeer | B64F 1/12 244/110 C |
| 9,434,481 | B2 * | 9/2016 | McGeer | B64F 1/02 |
| 9,505,493 | B2 * | 11/2016 | Borko | B64F 1/12 |
| 2006/0249622 | A1 | 11/2006 | Steele | |
| 2009/0294595 | A1 * | 12/2009 | Pellegrino | B64G 1/646 244/172.4 |
| 2012/0271491 | A1 | 10/2012 | Spata | |
| 2013/0187599 | A1 | 7/2013 | Ranga et al. | |
| 2014/0232337 | A1 | 8/2014 | Namou et al. | |

OTHER PUBLICATIONS

"Notice of Allowance Issued in U.S. Appl. No. 14/481,428", dated Dec. 30, 2017, 18 Pages.

"Non-Final Office Action Issued in U.S. Appl. No. 15/437,829", dated Jun. 15, 2017, 16 Pages.

* cited by examiner

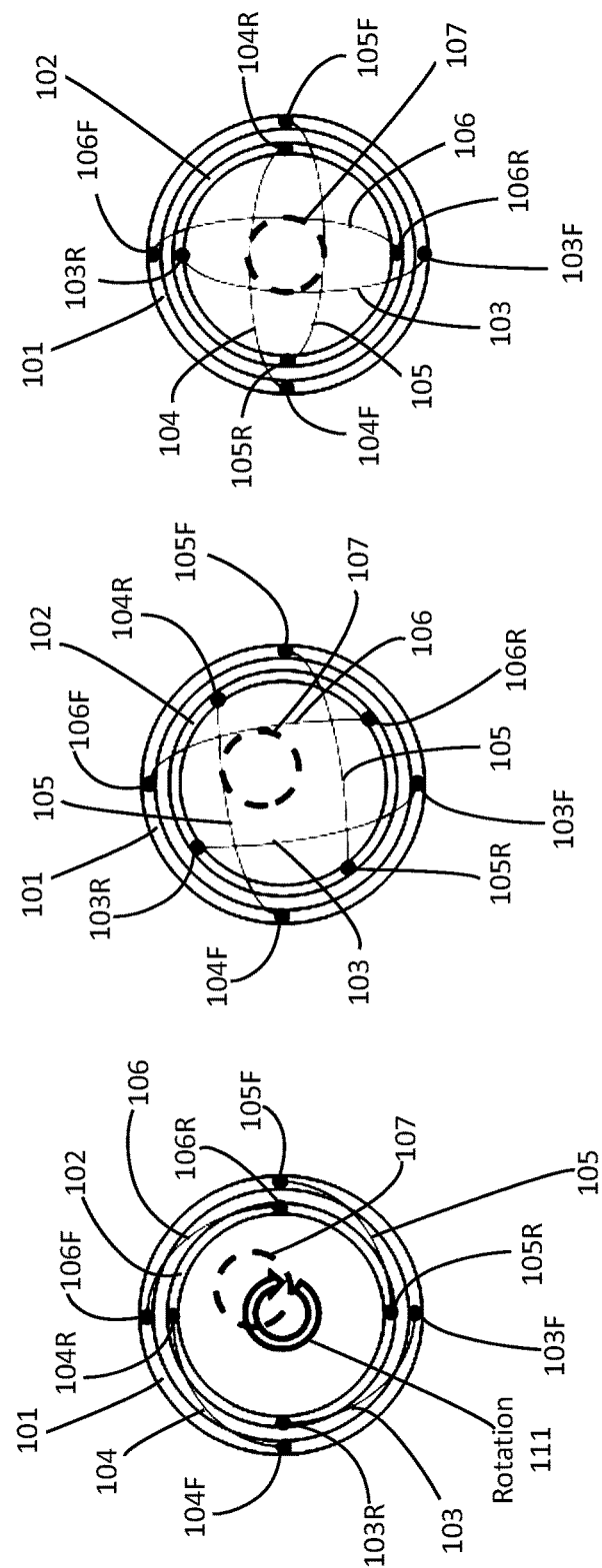

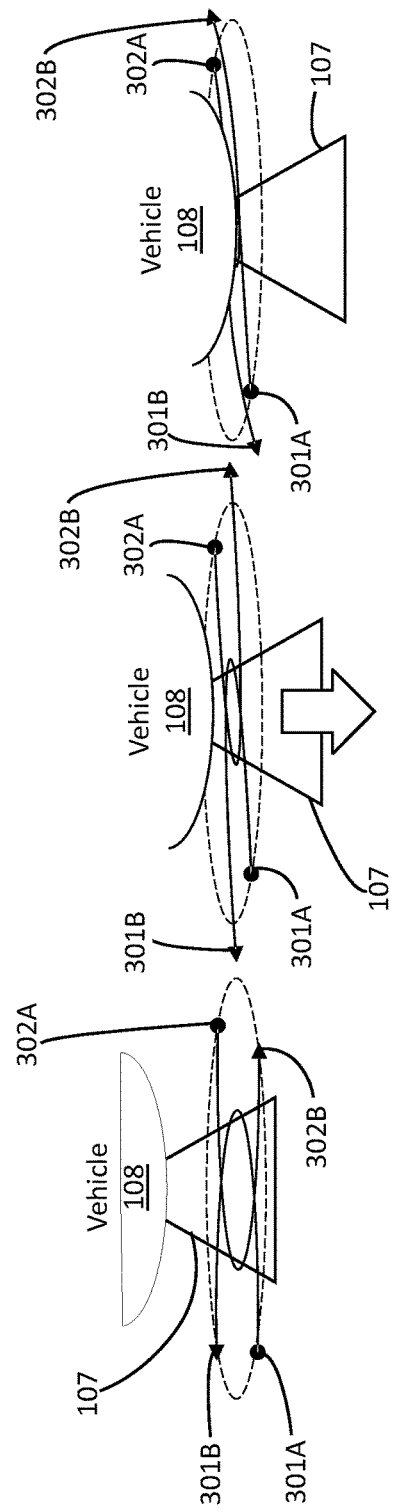

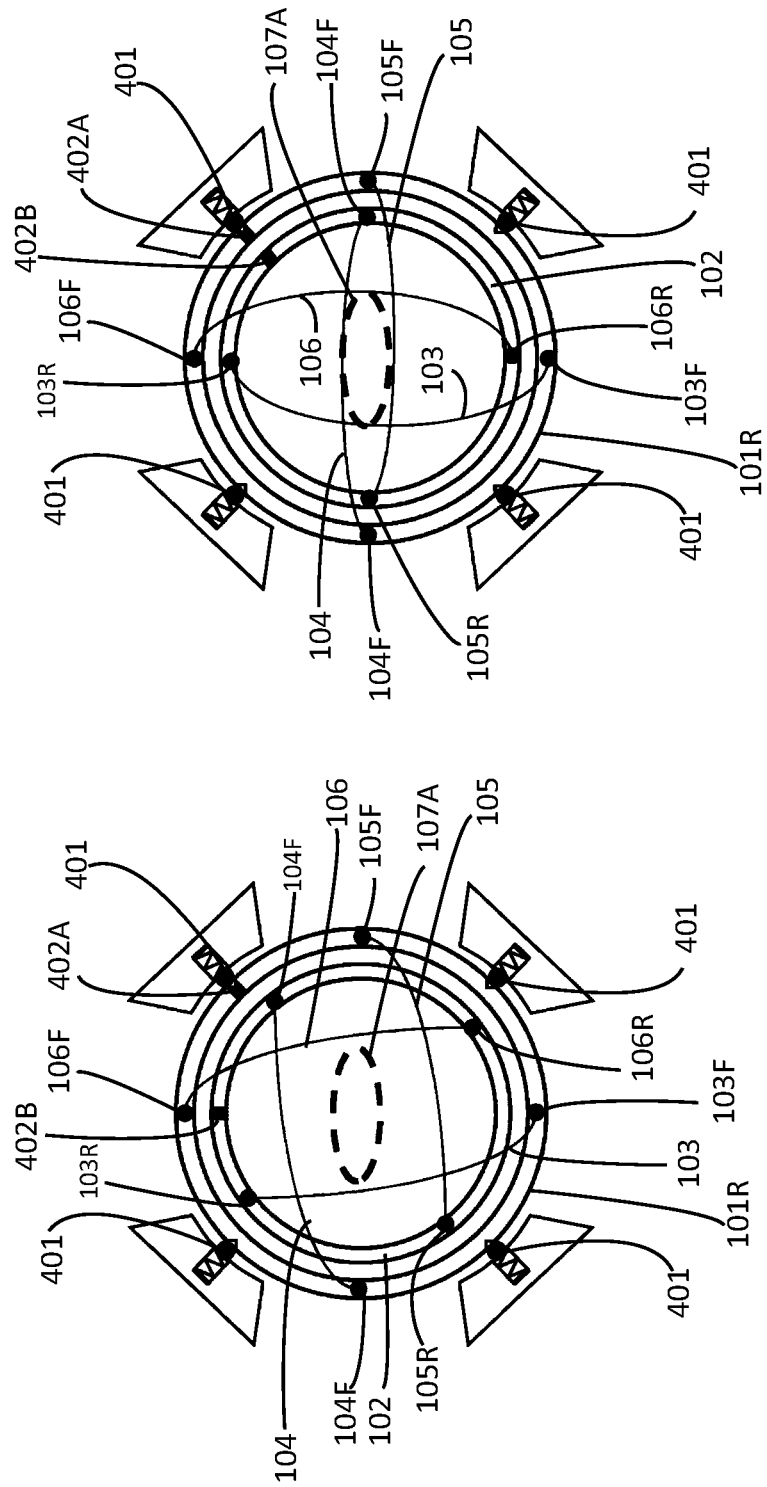

POSITIONING HOVERING OBJECTS FOR DOCKING

CROSS-REFERENCE TO RELATED APPLICATIONS

This application claims the benefit of and priority to U.S. Provisional Patent Application Ser. No. 61/975,364 entitled "Positioning Hovering Objects For Docking", filed Apr. 4, 2014 by Paul E. I. Pounds, the entire contents of which are expressly incorporated by reference.

BACKGROUND

Background and Relevant Art

Refueling or recharging of vehicles by automatic means is carried out by bringing the vehicle into positive contact with a supply station. Achieving positive contact includes using precision guidance to bring a vehicle onto charging contacts, into a refueling drogue, adjacent to a recharge pad, and so on. Precision guidance mechanisms typically require manual guidance or feedback control of trajectory, such as, by using visual markers or some other sensing modality.

A variety of active alignment methods, such as, spacecraft docking adaptors, also rely on accurate orientation alignment prior to engagement. Orientation or position errors may result in the rejection or ejection of the spacecraft in a docking attempt.

BRIEF SUMMARY

The present invention extends to methods, systems, devices, apparatus, and computer program products for capturing a target. A captured target can be adjusted into one or more of: a specific alignment, a specific position, and a specific orientation.

A device (e.g., circular or of other geometry) captures a sloping surface built into a hovering or floating object (e.g., an aircraft or space craft). The device then adjusts the hovering or floating object including one or more of: (a) drawing the hovering or floating object down into a specified position (e.g., adjacent or into a mating surface) and/or (b) rotating the hovering or floating object into a desired heading. In some embodiments, a hovering or floating object is adjusted for coupling with replenishment utilities.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

The specific features, aspects and advantages of the present invention will become better understood with regard to the following description and accompanying drawings where:

FIGS. 2A-2C illustrate a top view sequence of capturing the sloping surface of the vehicle with the capture device of FIG. 1.

FIGS. 3A-3C illustrate a side view sequence of capturing the sloping surface of the vehicle with the capture device of FIG. 1.

FIGS. 4A-4C illustrate a top view sequence of capturing and positioning another sloping surface with a capture device.

DETAILED DESCRIPTION

Figure 1:
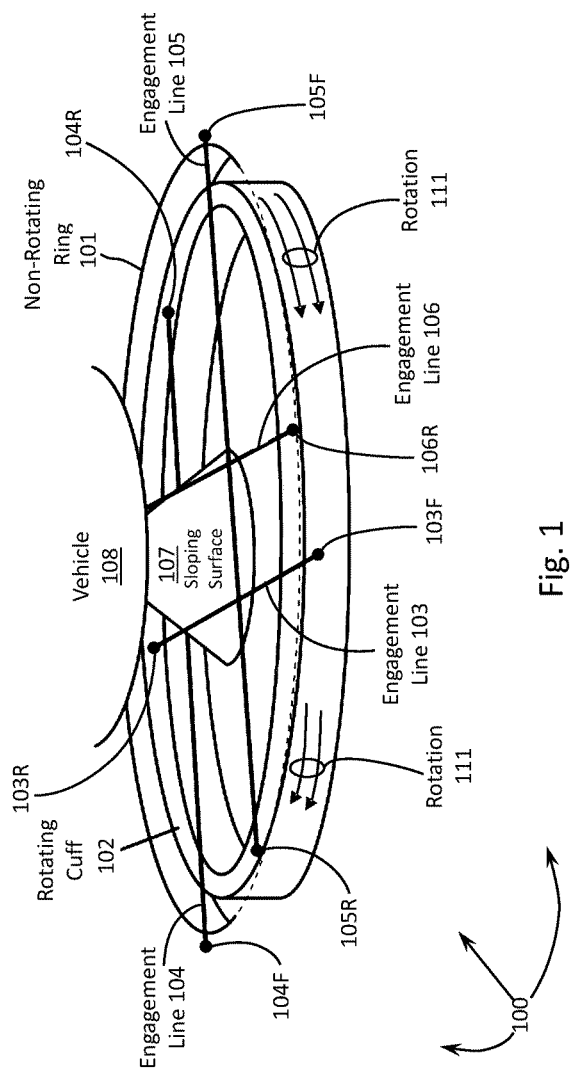
FIG. 1 illustrates an example of capturing the sloping surface of a vehicle with a capture device.

The present invention extends to methods, systems, devices, apparatus, and computer program products for capturing a target. A captured target can be adjusted into one or more of: a specific alignment, a specific position, and a specific orientation.

A device (e.g., circular or of some other geometry) captures a sloping target surface target built into a hovering or floating target (e.g., an airborne vehicle or craft, space borne vehicle or craft, water borne vehicle or craft). The device then adjusts the hovering or floating target including one or more of: (a) drawing the hovering or floating target down into a specified position (e.g., adjacent or into a mating surface) and/or (b) rotating the hovering or floating target into a desired heading. In some aspects, a hovering or floating target is adjusted for coupling with replenishment utilities.

For example, an active engagement apparatus can be used to (e.g., simultaneously) align a target to a reference position and orientation. The alignment position and orientation can be selected to match the target to a matching capture surface. The active engagement apparatus can include a rotating cuff with flexible lines or spars. A portion (e.g., one end of) each flexible line or spar is connected to a fixed portion of the active engagement apparatus and another portion (e.g., another end of) each flexible line or spar is connected to the rotating cuff. The flexible lines or spars engage with a sloping surface of a target. The rotating cuff then rotates causing the flexible lines or spars to pull the target towards the center of the rotator cuff, and drawing the target inwards.

A target, such as, a vehicle or craft, can be aligned for any of a variety of different reasons, including but not limited to: docking with a fixed structure, docking with another vehicle or craft, connecting to a recharging point or replenishment mechanism, landing, taking off, and holding a specific location or orientation for purposes such as maintenance of the vehicle, surveillance or performing a manual task with an end-effector.

Accordingly, embodiments include a capture device for capturing and aligning a hovering or floating vehicle. A hovering vehicle can be a fixed wing aircraft (e.g., an airplane) or rotary aircraft (e.g., a helicopter) that uses a propulsion system to overcome the Earth's gravity. In one aspect, a hovering vehicle is a Remotely Piloted Aircraft (RPA), such as, for example, an Unmanned Aerial Vehicle (UAV). A floating vehicle can float in different mediums including water (e.g., a boat or ship) and zero gravity environments (e.g., a spaceship, satellite, etc.). Some vehicles can hover and/or float depending on operational configuration (e.g., a submarine or other submersible)

The capture device can include a rotary cuff (fixed or mounted on another, for example, hovering or floating, vehicle), and capture components (e.g., one or more lugs, spars, or brackets bracket, or structure attached to or integrated with the top, bottom, side or other surface of the hovering vehicle). The capture device is configured such that a feature, for example, a sloping surface, of the vehicle may enter a capture area and be engaged by the rotary cuff.

The rotary cuff can include a fixed portion and a rotating portion. The rotating portion is connected to the fixed version with a roller bearing. The roller bearing allows the rotating portion to turn freely. One or more capturing components, such as, for example, flexible cables or rigid spars are used to align and/or capture the vehicle. One portion of the capturing components is attached to the fixed portion of the rotary cuff and another portion of the capturing components are attached to the rotating portion of the rotary cuff.

The rotary cuff is of sufficient diameter to permit a vehicle operator to relatively easily guide a feature of the vehicle, for example, a sloping surface, into the rotary cuff. Then, as the rotating portion rotates, the capturing components are drawn inward across the capture device and engage the surface of the target vehicle feature. As such, the vehicle feature (and thus also the vehicle) is essentially simultaneously drawn towards the center of the rotary cuff and downwards into the rotary cuff. The capture device can include sloped, slanted or curved structures or other geometry to facilitate appropriate movement. With sufficient rotation of the rotating portion, the vehicle is moved into contact with the center and base of the rotor cuff, holding it in place.

In other embodiments, one or more spars are attached to fixed points on a ring (or other geometric shape) and can be independently servoed. The ring (other geometric shape) is of sufficient diameter to permit a vehicle operator to relatively easily guide a feature of the vehicle, for example, a sloping surface, into the ring (or other geometric shape). In these other embodiments, the ring (or other geometric shape) can be fixed or rotating.

When attached to a fixed ring (or other fixed geometric shape) the one or more spars can be independently or interoperativley servoed to capture a vehicle. The one or more spars can then be independently or interoperativley servoed to adjust the position and/or orientation of the captured vehicle. Alternately, when attached to a rotating ring (or other rotating geometric shape), the ring (or other rotating geometric shape) can be rotated causing the one or more spars to capture a vehicle. Before, during, or after rotation, the one or more spars can be independently or interoperativley servoed to adjust the position and/or orientation of the captured vehicle.

Other geometric shapes can include shapes that are essentially (but not necessarily precisely) circular, for example, due to errors or tolerances in a manufacturing process. Other geometric shapes are specifically designed not to be essentially circular. For example, a rotating geometric shape can be elliptical.

FIG. 1 illustrates an example of capturing sloping surface 107 of vehicle 108 (a hovering or floating vehicle, such as, for example, a Remotely Piloted Aircraft (RPA)) with capture device 100. As depicted, capture device 100 includes non-rotating ring 101, rotating cuff 102, and engagement lines 103, 104, 105 and 106. Each engagement line has one end attached to non-rotating ring 101 and another end attached to rotating cuff 102. For example, end 103F (fixed) of engagement line 103 is attached to non-rotating ring 101 and end 103R (rotating) of engagement line 103 is attached to rotating cuff 102. Similarly, end 104F (fixed) of engagement line 104 is attached to non-rotating ring 101 and end 104R (rotating) of engagement line 104 is attached to rotating cuff 102. Likewise, end 105F (fixed) of engagement line 105 is attached to non-rotating ring 101 and end 105R (rotating) of engagement line 105 is attached to rotating cuff 102. Similarly, end 106F (fixed) of engagement line 106 (not shown in FIG. 1) is attached to non-rotating ring 101 and end 103R (rotating) of engagement line 106 is attached to rotating cuff 102.

Non-rotating ring 101 can be made out of metal, plastic, or any other material of sufficient strength, or combination thereof. Likewise, rotating cuff 102 can be made out of metal, plastic, or any other material of sufficient strength, or combination thereof.

Sloping surface 107 is a surface of hovering or floating vehicle 108. Rotation 111 indicates the direction of rotation.

FIGS. 2A-2C illustrate a top view sequence of capturing sloping surface 107 of vehicle 108 (a hovering or floating vehicle, such as, for example, a Remotely Piloted Aircraft (RPA)) with capture device 100. FIG. 2A depicts sloping surface 107 within rotating cuff 102. FIG. 2B depicts rotating cuff 102 subject to rotation 111. As shown in FIG. 2B, engagement lines 105 and 106 are in contact with sloping surface 107 drawing sloping surface 107 towards the center of rotating cuff 102. FIG. 2C depicts engagement lines 103-106 in contact with sloping surface 107. Rotating cuff 102 is stopped with engagement lines 103-106 securing sloping surface 107 and thus also vehicle 108 in place.

A rotating cuff can be rotated in either of a clockwise direction or a counter clockwise direction.

FIGS. 3A-3C illustrate a side view sequence of capturing sloping surface 107 of vehicle 108 (a hovering or floating vehicle, such as, for example, a Remotely Piloted Aircraft (RPA)) with capture device 100. FIGS. 3A-3C depict the vertical action of capture device 100 as rotating cuff 102 is engaged. FIG. 3A depicts rotating cuff 102 engaged with sloping surface 107. FIG. 3B depicts engagement lines sliding over sloping surface 107 such that vehicle 108 is drawn downward. FIG. 3C shows vehicle 108 drawn and locked. In FIGS. 3A-3C, arrows 301A-301B and 302A-302B indicate the general path of the engagement lines.

A rotating cuff can be rotated in either of a clockwise direction or counter clockwise direction. For example, the direction of rotation in FIGS. 1 and 2A-2C is opposite of the direction of rotation in FIGS. 3A-3C.

A vehicle's capture feature (e.g., sloping surface 107, sloping surface 107A, or sloped target 507) and/or a rotary cuff (e.g., rotating cuff 102) can be arranged symmetrical or asymmetrical. As such, after a vehicle is drawn in and centered, the rotary cuff can continue to be rotated to rotate the vehicle about the rotary cuff axis. Rotating the vehicle can be used to face the vehicle in a specified direction.

A slip ring with a clutch can be used. When tension on cables or spars of the rotary cuff exceeds a threshold, a bottom plate can continue to turn freely. The bottom plate can include an alignment pin that engages with some vehicle geometry so that a rotating effort may be applied to the vehicle.

Figure 4C:
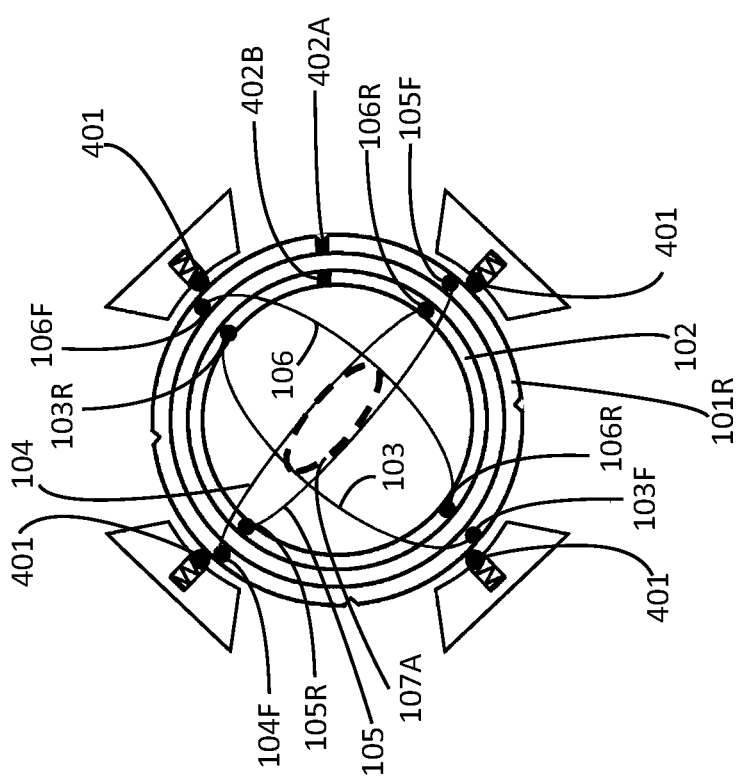

FIGS. 4A-4C illustrate a top view sequence of capturing and positioning non-circular sloping surface 107A with another capture device. FIGS. 4A-4C also depict an added slip-clutch arrangement using spring detents 401. Spring detents 401 allow over-driving of the capture mechanism to capture non-circular sloping surface 107A (e.g., of a hovering or floating vehicle). As depicted in FIGS. 4A-4C, non-rotating ring 101 is replaced with rotating outer ring 101R held by detents 401. Rotating outer ring 101R and rotational cuff 102 together allows for planar rotation of non-circular sloping surface 107A (and corresponding vehicle, such as, for example, a Remotely Piloted Aircraft (RPA)). Markers 402A and 402B indicate relative orientations of rotating cuff 102 and outer ring 101R. FIG. 4C depicts non-circular sloping surface 107A rotated approximately 45 degrees relative to the orientation of non-circular sloping surface 107A depicted in FIG. 4B. As depicted in FIG. 4C, markers 402A and 402B remained aligned with one another.

Rotating outer ring 101R can be made out of metal, plastic, or any other material of sufficient strength, or combination thereof.

In some aspects, engagement lines or spars can be independently actuated to position, reposition, move or engage a captured vehicle at any specified point inside the rotator cuff.

Figure 5B:
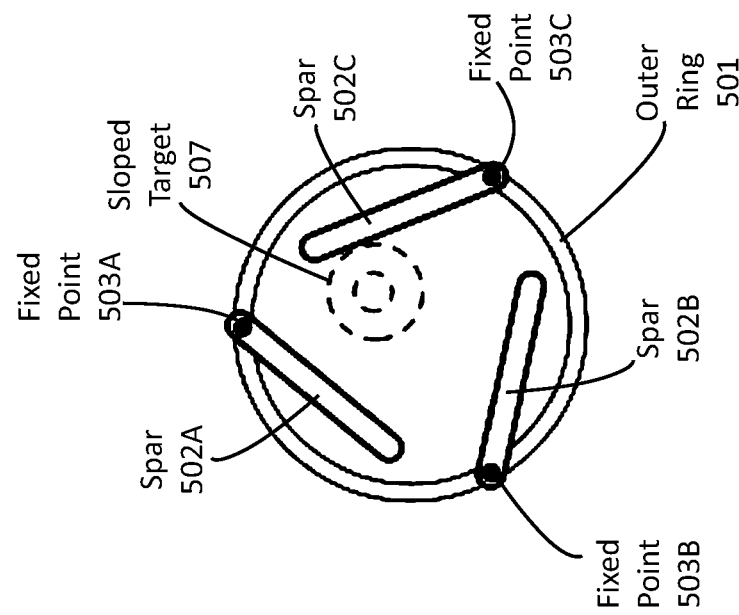
FIGS. 5A-5E illustrate a top view of capturing and positioning a sloped target with a capture device.
Figure 5A:
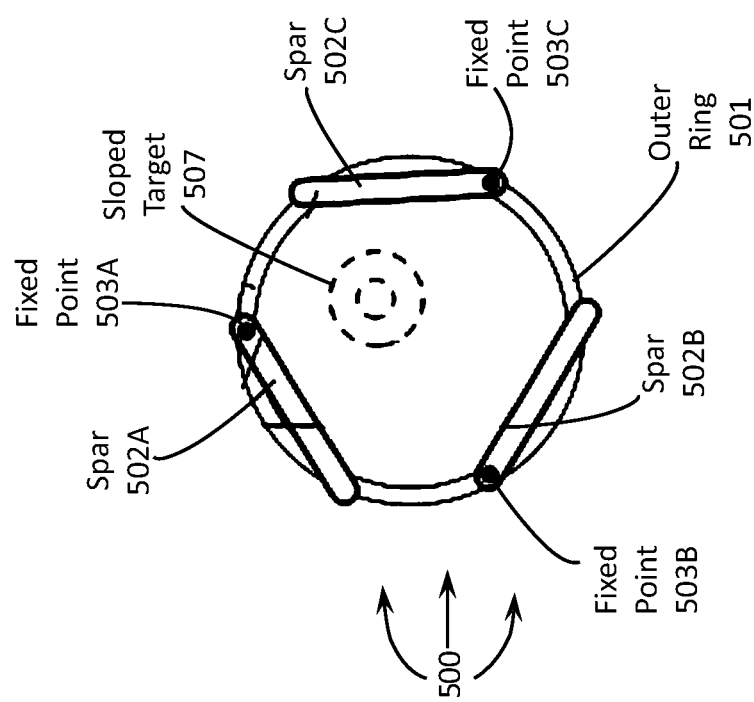
Figure 5D:
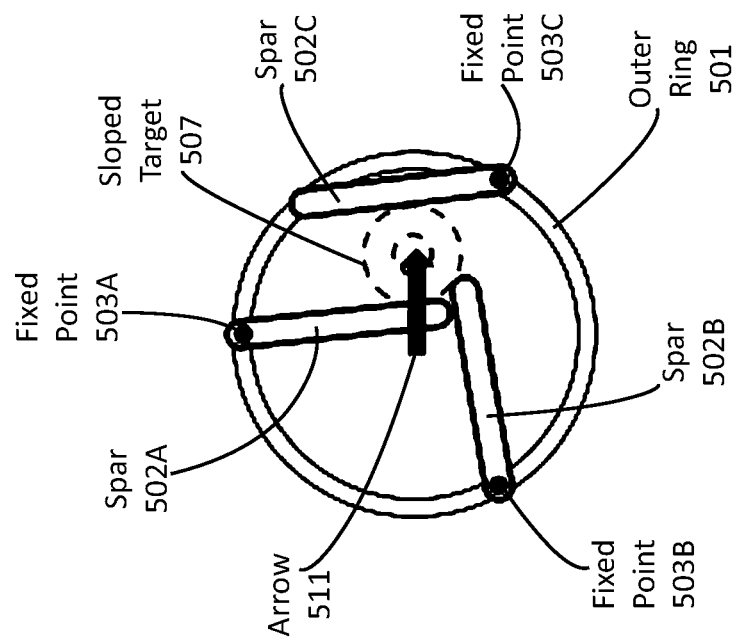

FIGS. 5A-5E illustrate a top view sequence of capturing and positioning sloped target 507 with capture device 500. Capture device 500 can capture (e.g., conical) sloped target 507. As depicted in FIG. 5A, capture device 500 includes outer ring 501 and spars 502A, 502B, and 502C. Spars 502A, 502B, and 502C are attached to outer ring 501 at fixed points 503A, 503B, and 503C respectively. Spars 502A, 502B, and 502C can rotate at fixed points 503A, 503B, and 503C respectively. Spars 502A, 502B, and 502C can be actuated by a rotator cuff (not shown). The inner dashed circle of sloped target 507 indicates the minimum thickness of sloped target 507 at an upper point.

Figure 5C:
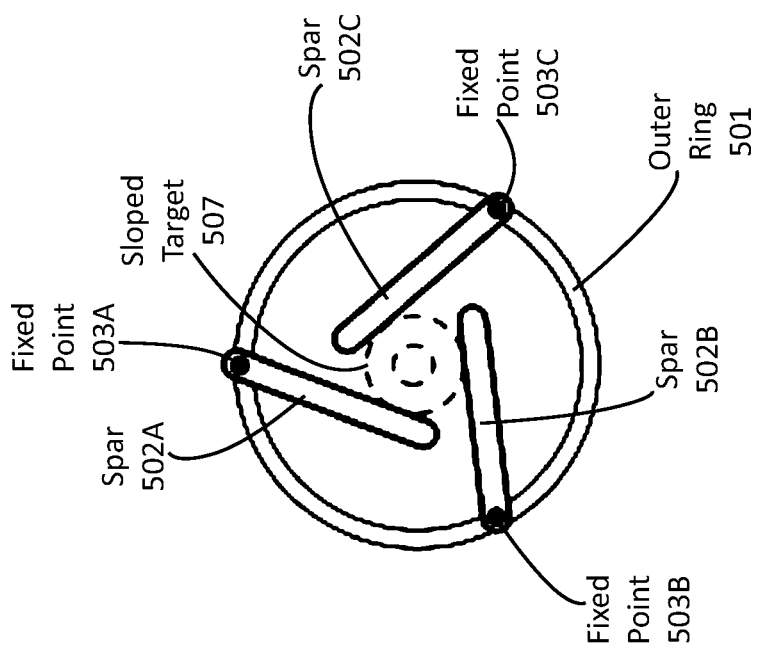
Figure 5E:
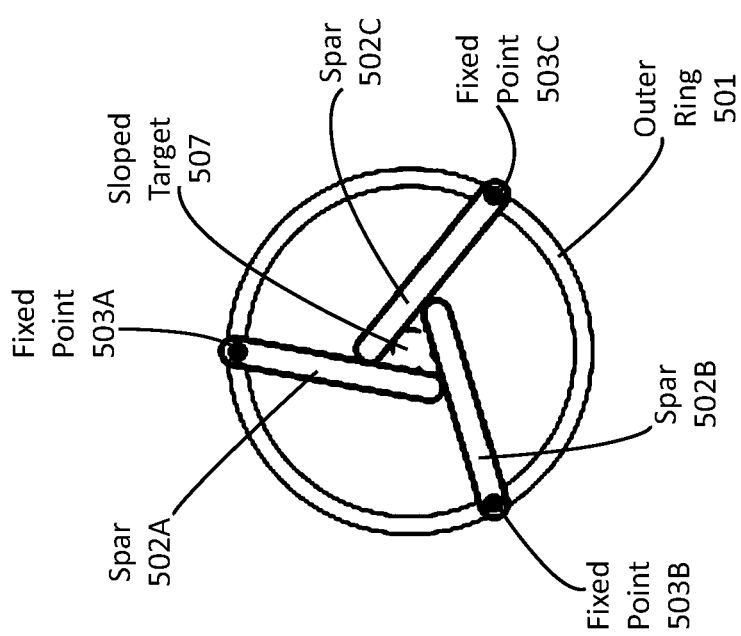
Figure 5F:
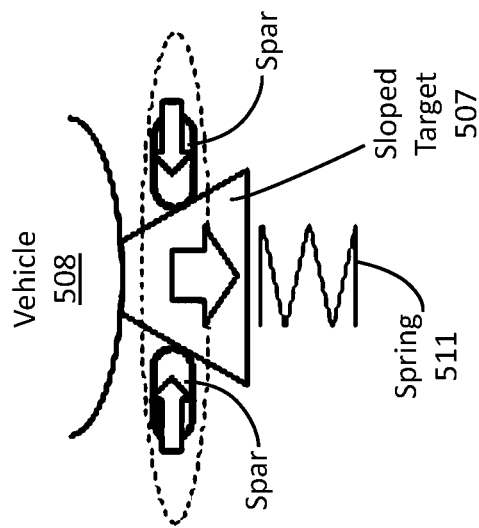
FIG. 5F illustrates a side view of capturing and positioning the sloped target with the capture device of FIGS. 5A-5E.

FIG. 5B depicts sloped target 507 being captured by bringing spars 502A, 502B, and 502C into the center of outer ring 501. FIG. 5C depicts trapping sloped target 507 with spars 502A, 502B, and 502C. As depicted by 511 in FIG. 5D, spars 502A, 502B, and 502C can be independently controlled to adjust the position of sloped target 507 within ring 501. As depicted in FIG. 5E, by positioning a spring underneath sloped target 507, spars 502A, 502B, and 502C can work collectively to move sloped target 507 vertically within outer ring 501. FIG. 5F illustrates a side view of capturing the sloped target 507 with the capture device 100. FIG. 5F depicts sloped target 507 as part of a vehicle 508 (e.g., a Remotely Piloted Aircraft (RPA)). By closing the spars, inward pressure is applied to sloped target 507 and in turn pushes sloped target 507 downwards. Opening spars 502A, 502B, and 502C allows sloped target 507 to be pushed outwards (by spring 511).

Outer ring 501 can be made out of metal, plastic, or any other material of sufficient strength, or combination thereof.

In some aspects, clamps, magnets, clasps or other locking mechanisms engage with a captured vehicle to prevent it from moving once the rotor cuff is disengaged.

A capture device can align and position a captured vehicle for supplying or resupplying the vehicle with electricity or other consumables such as fuel. Furthermore, the use of the rotor cuff facing feature to cause fuel lines and conduits to align with the captured vehicle, either while the vehicle continues to operate or when it is shut down.

A capture device, with or without locking mechanisms, can be configured to attach a further structure to a vehicle. For example, a vehicle can use a battery pack for power. To recharge, the vehicle is captured in the capture device. An existing battery pack is released and a new battery pack attached using the capture device (potentially without the need for landing).

In some aspects, different portions of a capture device are mounted on different structures, such as, for example, on a vehicle and a fixed structure or on two vehicles. For example, a rotary cuff can be mounted on a vehicle and the reaming portions of the capture device on a fixed structure. Alternately, a rotary cuff can be mounted on one vehicle and the remaining portions of a capture device mounted on another vehicle. As such, when engaged, the two vehicles become a single joined unit—both during movement (e.g., in flight) or on the ground.

Multiple rotor cuff mechanisms, multiple capture device mechanisms or some combination of one or more rotor cuff and capture devices can be mounted on one or more vehicles, such that flying or static arrangements may be assembled.

Analog and/or digital systems can be used to control and actuate components of an capture device (e.g., to rotate a rotary cuff or actuate individual spars), whether mounted on a fixed structure or mounted on a vehicle. For example, analog and/or digital systems can be used to control and actuate one or more mechanical, hydraulic, and electronic components to rotate a rotary cuff or actuate spars. Components of a capture device can be controlled manually or automatically. In some aspects, associated sensors can sense an approaching vehicle and determine when a vehicle feature is appropriately positioned within a rotary cuff. When the vehicle is sensed to be an appropriate position for capture, a rotary cuff or spars can be actuated to initiate alignment and/or capture of the vehicle. Additional sensors can detect when the vehicle is captured. When the vehicle is captured, replenishment activities can be automatically and/or manually initiated.

A capture device can include computer network connectivity components (e.g., a Network Interface Card ("NIC") or cellular modem) connecting the alignment capture device to a computer network. As such, modules, algorithms, components, etc., within and/or for controlling a capture device be connected to other modules, algorithms, components, etc., over (or be part of) a network, such as, for example, a Local Area Network ("LAN"), a Wide Area Network ("WAN"), and even the Internet. Accordingly, the modules, algorithms, components, etc., within and/or for controlling a capture device as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

As such, components within and/or for controlling a capture device can be operated (e.g., remotely) over the computer network. When a control system (e.g., a remote control system) is used to control a vehicle (whether the vehicle is manned or unmanned), the control system can also be used to control any components of an capture device mounted to the vehicle.

In some aspects, one or more capture devices are controlled (e.g., over a network) through autonomous operation by a robotic vehicle or system.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A device for capturing a hovering or floating vehicle, the device comprising:
   a rotary cuff including:
     a fixed component; and
     a rotating component;
   one or more engagement lines, each of the one or more engagement lines having one end attached to the fix component and another end attached to the rotating component; and
   wherein the rotating component is configured to rotate relative to the fixed component to cause the one or more engagement lines to engage a sloping feature of the hovering or floating vehicle to essentially simultaneously: (a) draw the position of the sloping feature towards a defined capture area within the rotary cuff and (b) draw the position of the sloping feature downwards toward the rotary cuff; wherein the sloping feature is widest at a distal end from the vehicle and narrows to an end proximal to the vehicle.

2. The device of claim 1, wherein the one or more engagement lines comprise a plurality of engagement lines.

3. The device of claim 2, wherein the plurality of engagement lines comprises a plurality of engagement lines configured to draw the feature of the hovering or floating vehicle toward the capture area for docking as the rotating component is rotated.

4. The device of claim 2, wherein the plurality of engagement lines comprises a plurality of engagement lines configured to orient or reorient the hovering or floating vehicle within the capture area as the rotating component is rotated.

5. The device of claim 1, wherein the fixed component comprises a non-rotating ring and the rotating component comprises a rotating ring, wherein the rotating ring is positioned concentrically inside the non-rotating ring.

6. The device of claim 5, wherein the rotating component being configured to rotate relative to the fixed component comprises the rotating ring being configured to rotate axially about the feature.

7. The device of claim 1, further comprising at least one of: a clamp, a clip, a magnet, or another latching or securing component for securing the hovering or floating vehicle within the defined capture area.

8. The device of claim 1, further comprising a replenishment system for recharging, refueling or resupplying the hovering or floating vehicle; and
wherein the device aligns the hovering or floating vehicle for coupling with the replenishment system.

9. The device of claim 1, further comprising a control system for controlling rotation of the rotating component.

10. The device of claim 1, further comprising one or more sensors for sensing both:
(a) when the hovering or floating vehicle is appropriately positioned with the defined capture area; and
(b) when the hovering or floating vehicle is captured.

11. A method for use at a capture device, the capture device including a plurality of capture components attached to a ring, the method for capturing a hovering or floating vehicle, the method comprising:
detecting a sloping feature of the hovering or floating vehicle within the ring; and
rotating the ring axially around the sloping feature to cause the plurality capture components to engage with the sloping feature to, as the ring rotates, essentially simultaneously (a) draw the position of the hovering or floating vehicle within the towards a defined capture area within the ring and (b) draw the position of the hovering or floating vehicle downwards toward the ring; wherein the sloping feature is widest at a distal end from the vehicle and narrows to an end proximal to the vehicle.

12. The device of claim 11, wherein the plurality of capture components comprises a plurality of engagement lines, and wherein rotating the ring comprises rotating the ring to cause the plurality of engagement lines to draw the sloping feature inwards toward the capture area as the ring rotates.

13. The device of claim 11, wherein rotating the ring comprises rotating ring to orient or reorient the hovering or floating vehicle inside the ring.

14. The device of claim 11, wherein detecting a sloping feature of the hovering or floating vehicle comprises detecting a sloping feature of a Remotely Piloted Aircraft (RPA).

* * * * *